United States Patent [19]

Heredia

[11] 4,259,000
[45] Mar. 31, 1981

[54] CAMERA GRIP AND FLASH HOLDER

[76] Inventor: R. Victor Heredia, 3260 "F" St., San Diego, Calif. 92102

[21] Appl. No.: 119,358

[22] Filed: Feb. 7, 1980

[51] Int. Cl.³ .............................................. G03B 17/56
[52] U.S. Cl. ................................................. 354/293
[58] Field of Search ................... 354/293, 295, 81, 82, 354/126, 132, 145

[56] References Cited

U.S. PATENT DOCUMENTS

| 2,261,953 | 11/1941 | Brown | 354/132 |
|---|---|---|---|
| 2,479,716 | 8/1949 | Bensen | 354/293 X |
| 2,740,321 | 4/1956 | Anderson | 354/295 X |
| 2,943,547 | 7/1960 | Martin | 354/293 |
| 2,961,937 | 11/1960 | Karpf | 354/82 |
| 3,187,170 | 6/1965 | Kille | 354/145 X |
| 3,289,563 | 12/1966 | Kent | 354/293 |
| 3,550,519 | 12/1970 | Lewis | 354/293 |
| 3,575,098 | 4/1971 | Jones | 354/293 |
| 3,731,897 | 5/1973 | Price | 354/293 |
| 3,820,148 | 6/1974 | Osanai | 354/82 X |
| 3,852,788 | 12/1974 | Veda | 354/293 |
| 3,855,602 | 12/1974 | Hoos | 354/293 |
| 3,893,145 | 7/1975 | King | 354/293 |
| 3,938,166 | 2/1976 | Sloop | 354/82 |
| 4,081,814 | 8/1976 | Bulland | 354/82 X |
| 4,091,402 | 5/1978 | Siegel | 354/293 |
| 4,104,623 | 8/1978 | Sloop | 354/293 |

FOREIGN PATENT DOCUMENTS 728964  4/1955  United Kingdom ..................... 354/293

Primary Examiner—Donald A. Griffin
Attorney, Agent, or Firm—Brown & Martin

[57] ABSTRACT

A bracket which includes a flat bottom and two upstanding arms is attached to the bottom of a camera and has one offset end with a first upstanding arm and projecting therefrom which is positioned in contact with the face of the camera on one side of the lens barrel in position to be gripped by the fingers of a hand holding the camera. A notch is cut in the first upstanding arm to permit the index finger to operate the camera shutter button and a flash mount is attached to the upper end of the arm. The second upstanding arm is spaced from the other side of the camera and has a hand grip thereon and a flash mount attached to its upper end.

10 Claims, 4 Drawing Figures

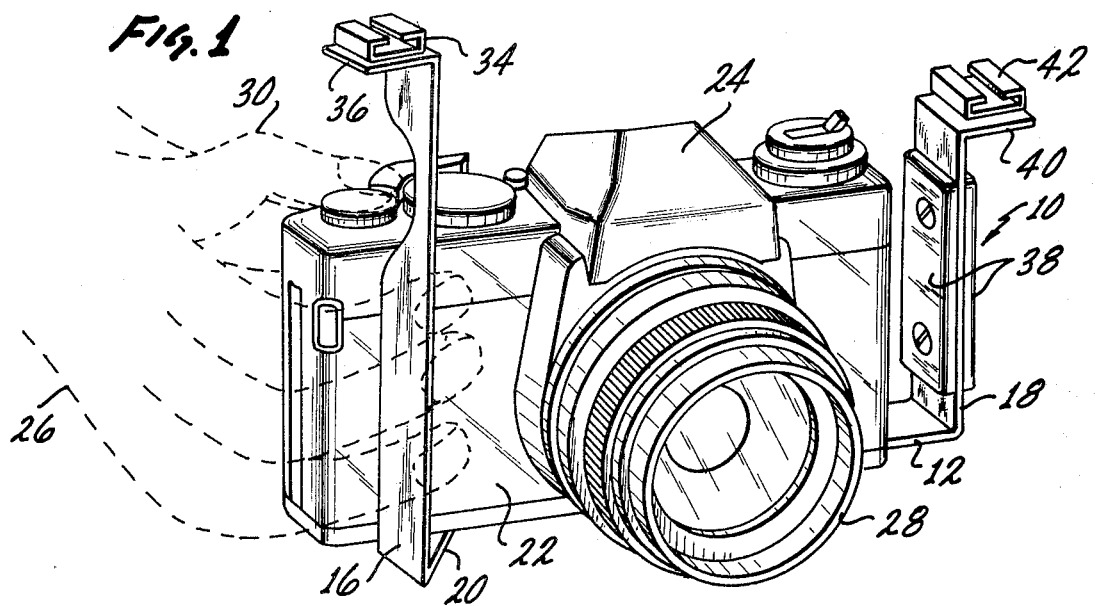

4,259,000

CAMERA GRIP AND FLASH HOLDER

BACKGROUND OF THE INVENTION

This invention relates to camera grips and flash holders. Most cameras, particularly SLR cameras, have a relatively flat front face which does not provide a secure gripping surface from the right hand (shutter hand). The problem is compounded when relatively heavy telephoto or zoom lenses are used. Combined hand grips and flash holders have been made in the past which may be attached to a camera to be held by one hand, but these prior art camera grips are generally designed for gripping by the left hand and the photographer is forced to change hands after focusing. Further, the left hand is the weaker hand for most persons. Those camera attachments that do provide some gripping surface on the right side of the camera such as a motor drive where the motor case is positioned along the front face have not provided a secure grip that may be used for long periods without fatigue. Also the motor drive adds considerable additional weight compounding the problem. Other such devices have required special mating structure to secure the device in place.

It would therefore be desirable to have a lightweight camera grip that is readily attached to a wide variety of cameras and provides a secure gripping surface to support the camera with the right hand while at the same time actuating the shutter.

SUMMARY OF THE INVENTION

An exemplary embodiment of the invention incorporates a flat base piece and at least one upstanding flat grip element. The base piece is secured to the underside of a camera utilizing the standard tripod mount. The base piece has one offset end, and an upstanding finger grip element projecting vertically of the offset end and positioned in contact with the front face of the camera, spaced from the lens barrel. The second through fourth fingers of the photographers hand contact the finder grip element and the face of the camera to provide a secure grip enabling the photographer to hold the camera with one hand. The upper part of the finger grip element immediately above the top of the camera incorporates a cut-out so that the first finger can reach behind the grip and operate the shutter thus eliminating the need for a cable release which is often necessary with prior art auxiliary camera grips. The uppermost part of the finger grip may advantageously incorporate a flash mount to serve as an extender for a flash attachment.

A hand grip element may advantageously provide for the left hand and may incorporate a second flash mount.

The objects of the invention include providing a new and improved hand grip/flash holder for cameras that permit the camera to be held and the shutter released using only the right hand. The benefits of the invention are particularly apparent when taking pictures in the vertical format. The camera grip is held securely to the camera with only a single point of attachment at the tripod mount because the finger grip element is braced against the front of the camera.

Other objects and many attendant advantages of the present invention will be more apparent upon a reading of the detailed description together with the appended drawings.

BRIEF DESCRIPTION OF THE DRAWINGS

FIG. 1 is a perspective view of a camera fitted with the preferred embodiment of the invention.

FIG. 2 is a bottom plan view of a camera and grip bracket shown in FIG. 1.

FIG. 3 is a front elevational view of the grip bracket by itself.

FIG. 4 is a cross-sectional view taken on line 4—4 of FIG. 3.

DESCRIPTION OF THE PREFERRED EMBODIMENT

Referring to FIGS. 1, 2 and 3, the preferred embodiment of the invention is a camera grip 10 which may be advantageously made out of plastic-coated steel with a rectangular cross-section. The grip 10 has a base piece 12 with a slot 14 and two upstanding grip elements 16 and 18. One end of the base piece 12 is offset at 20 (FIG. 2) so as to place the finger grip upstanding element 16 in contact with front face 22 of camera 24 and in position to be gripped by the fingers of a hand 26 holding the camera. Finger grip 16 is offset from the perpendicular to the camera face 22 toward the lens barrel 28 of camera 24 to provide a more firm finger grip, especially in the vertical orientation of the camera.

Referring especially to FIG. 1, finger grip 16 is gripped by the last three fingers of hand 26 while the index finger 30 is free to operate the shutter release. A notch 32 is formed in upstanding finger grip 16 to provide clearance for index finger 30. The notch 32 therefore permits the finger grip to have adequate vertical extent for good gripping security and at the same time to permit the index finger of the gripping hand to operate the shutter.

A standard flash mount 34 is attached to the upper end of finger grip 16, which is bent at a right angle at its upper end from a flange 36 which supports flash mount 34.

The hand grip element 18 is spaced from the opposite side of camera 24 and has plastic handle grips 38 fastened to its central portion. The hand grip element 18 is bent at right angles at its upper end to form a flange 40 which supports a second standard flash mount 42. The incorporation of the second hand grip element 18 is particularly useful for cameras with zoom lenses or telephoto lenses, because it is especially necessary to steady the camera against vibrations or other movement when using these lenses. However, the finger grip element 16 by itself provides a grip which enables the camera 24 to be held and operated by one hand.

As shown in FIG. 2, the camera grip 10 is attached to the bottom of the camera 24 by a bolt 44 which extends through the slot 14 in the bottom 12 and screws into the threaded opening on the bottom of the camera 24 that is provided for a tripod mount. Bolt 44 has a round, knurled head 46 for easy hand insertion.

Having described my invention, I now claim:

1. A camera grip for use in combination with a camera having a threaded opening in it's bottom surface, said camera grip comprising:
    a base piece having a flat camera engaging surface, said base piece underlying the body of the camera over a first portion of it's length and having an angular offset on the second portion of it's length to position the shutter related end of said base piece forwardly of the camera body, said base piece and said offset being coplanar, and an upstanding finger grip element extending upwardly from the offset end of said base piece;

means for securing said base piece to the underside of said camera through the threaded opening;

said offset being dimensioned to position said finger grip element in front of said camera body and offset from the lens barrel thereof in position to be gripped by the fingers of a hand holding the camera, whereby the camera can be held and operated by one hand.

2. The camera grip defined in claim 1 wherein:

said means consisting of a bolt received through said base and threadable into the threaded opening of said camera.

3. The camera grip defined in claim 1 and also comprising:

a flash mount secured on top of said finger grip element.

4. The camera grip defined in claim 3 and also including:

a notch in said finger grip element to provide clearance for the index finger to operate said camera.

5. The camera defined in claim 1 and also comprising:

a second upstanding element on the opposite end of said base piece and comprising a hand grip.

6. The camera grip defined in claim 5 and also comprising:

a flash mount secured on the top of said second upstanding element.

7. The camera grip defined in claim 1 wherein:

said upstanding finger grip element has a flat surface facing said lens barrel.

8. The camera grip defined in claim 7 wherein:

said upstanding finger grip element comprises a flat element of rectangular cross-section.

9. the camera grip defined in claim 8 wherein:

said finger grip element comprises plastic-coated metal.

10. The camera grip defined in claim 8 wherein:

the flat face of the finger grip element facing the camera barrel is offset from the perpendicular to the camera face, toward the lens barrel.

* * * * *